Figure 1:
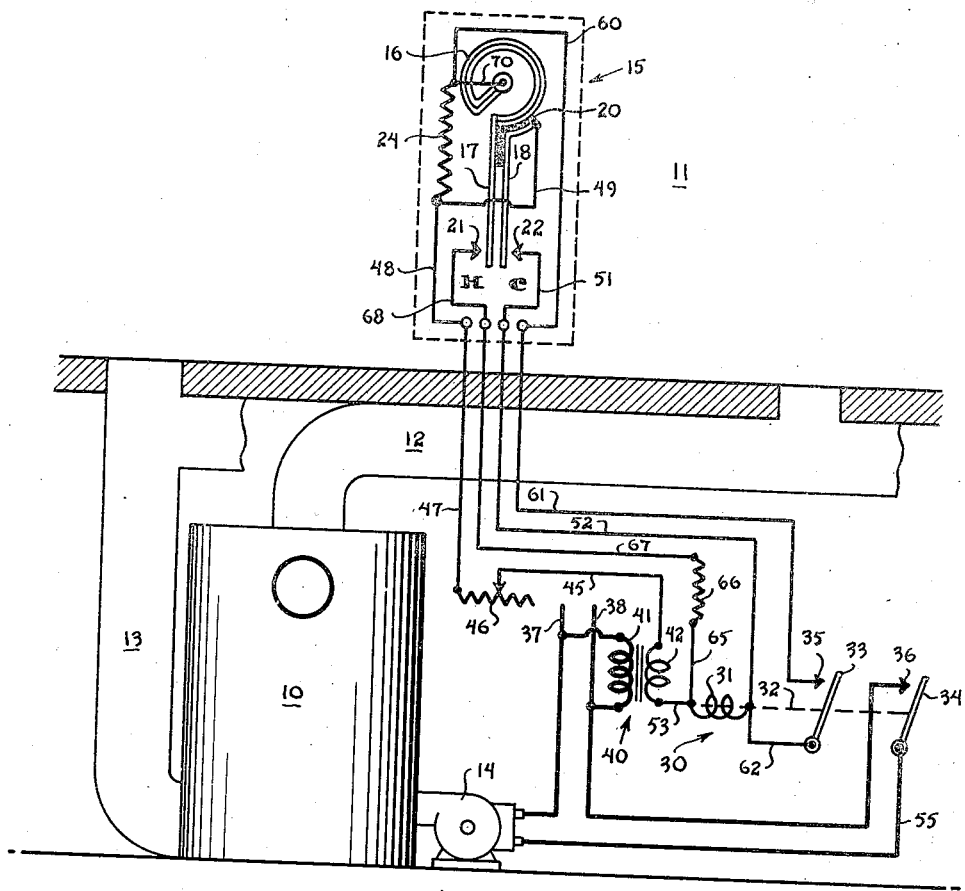

July 15, 1941.  G. I. HOLMES  2,248,924

TEMPERATURE CONTROL SYSTEM

Filed Nov. 14, 1938

Inventor
Gifford I. Holmes
By
George H. Fisher
Attorney

Patented July 15, 1941

2,248,924

UNITED STATES PATENT OFFICE 2,248,924

TEMPERATURE CONTROL SYSTEM

Gifford I. Holmes, Minneapolis, Minn., assignor to Minneapolis-Honeywell Regulator Company, Minneapolis, Minn., a corporation of Delaware Application November 14, 1938, Serial No. 240,226

12 Claims. (Cl. 236—68)

This invention relates to a temperature control system and more particularly to a control system for a heating system.

It is an inherent characteristic of all heating systems that a definite time elapses between the time that the heating plant is placed in operation and the time that the temperature of the space begins to rise as a result of the heating plant being placed in operation. Where the heating plant is controlled by an ordinary room thermostat and is placed in operation when the temperature of the space being heated drops to a certain value, the temperature of the space may continue to drop below this value before the temperature of the space actually starts to rise by reason of the heating plant being placed in operation on account of the time lag referred to above. Likewise, after the temperature of the space rises to the desired value and the room thermostat shuts down the heating plant, there may be sufficient residual heat in the heating plant and the conduits which conduct heat to the space that the temperature of the space will continue to rise above the desired value thus causing the temperature of the space to fluctuate considerably above and below the desired values.

Means have been provided to prevent the space temperature from rising above the desired value or overshooting by placing a heating element adjacent the thermostat and energizing this heater before the space temperature reaches the desired value so that the temperature will respond to a temperature which is somewhat higher than the ambient temperature and in this way the arrival of the heat is anticipated. In this manner, the temperature of the space has been effectively prevented from rising above the desired value. This may not, however, in many instances, effectively enough prevent the temperature from dropping too low since it does not anticipate the drop in temperature in the space.

In accordance with my invention, I have provided a novel arrangement of heating means which is able to control the thermostat so that both a rise and a fall in temperature in the space is effectively anticipated. By the use of this heating means the thermostat may have a substantial operating differential such as 3° F. and the heating means may supply 3 degrees of heat to the thermostat. As long as the thermostat is satisfied the heating means is energized so that the temperature of the thermostat is maintained at a value of 3 degrees above the space temperature, but as soon as the temperature begins to drop from the desired value the heating means is de-energized so that the temperature of the thermostat will fall more rapidly than that of the space and will move to the call for heat position before the space temperature falls to any great extent thus placing the heating plant in operation. When the space temperature begins to rise above the value at which the heating plant was placed in operation, the heating means is again energized and the temperature of the thermostat rises more rapidly than that of the space and the arrival of heat in the space is thus effectively anticipated.

It has been found impractical to produce this result by using a thermostat with an extremely narrow operating differential since otherwise the heating plant may be caused to cycle on and off rapidly and jarring of the contacts by reason of vibrations in the building, would seriously affect the operation thereof if they were spaced sufficiently close together. My invention is particularly applicable with that type of thermostat which has a contact arm movable between a pair of spaced contacts and which causes operation of the heating plant when one of the contacts is engaged thereby and which interrupts operation thereof only after the other contact is engaged thereby.

It is therefore an object of my invention to provide a temperature control system wherein increases and decreases in the temperature of the space being controlled are effectively anticipated in such a manner that the temperature of the space is maintained within very close limits.

Figure 2:
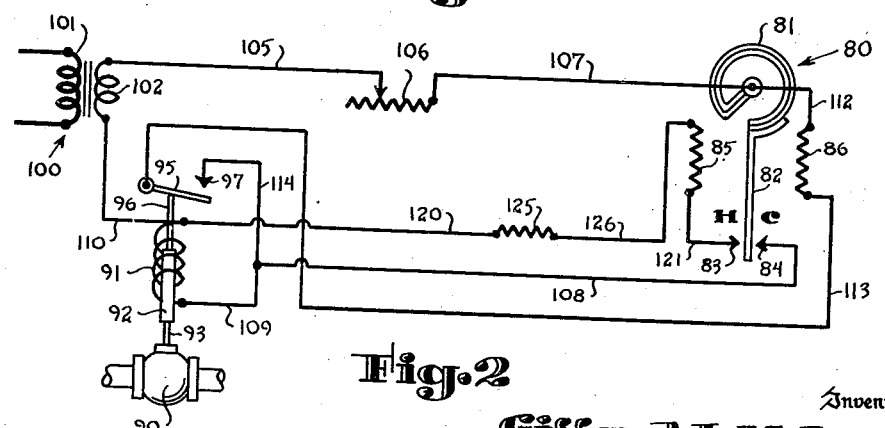

Other objects and advantages will become apparent upon a study of the specification, claims and appended drawing wherein:

Figure 1 is a schematic diagram of one form of system embodying the principles of my invention, and Figure 2 is a schematic diagram of another form of system embodying the principles of my invention.

Referring now to Figure 1, a furnace 10 is illustrated for heating a space 11. This furnace is illustrated as being a warm air furnace and is provided with warm air ducts 12 for conveying heated air through the space 11 and other spaces not illustrated, the air returning from the space or spaces to the furnace by means of the return air duct 13. An oil burner 14 is illustrated for heating the furnace 10 but it should be understood that any other suitable form of heating means may be provided. For example, in place of the burner 14, the furnace may be coal fired and draft and check dampers be controlled in accordance with the teachings of my invention or a suitable stoker mechanism may be controlled thereby. Also it should be understood that the furnace 10 instead of being a warm air furnace may be a hot water or steam furnace and it should be understood that the principles of my invention are applicable to any form of heating system.

Located in the space 11 is a thermostat indicated generally by the reference character 15. This thermostat is shown to comprise a bimetallic element 16 which carries contact arms 17 and 18 suitably spaced and insulated from one another by insulating material 20. The arm 17 may be suitably electrically connected to the bimetal element 16 whereas the arm 18 is insulated therefrom as illustrated. The arms 17 and 18 cooperate with the spaced contacts 21 and 22, the arrangement being such that as the temperature at the bimetal element 16 drops sufficiently, arm 18 moves into engagement with contact 22 and upon a sufficient rise in temperature the arm 17 is moved into engagement with the fixed contact 21. A heating element 24 is disposed in close proximity to the bimetallic element 16 and if desired may be wound around this bimetallic element, the energization of this heating element being controlled in a manner to be hereinafter set forth.

For controlling the operation of the burner 14 a relay generally indicated at 30 is provided. This relay comprises a relay coil 31 and an armature 32 connected to the switch arms 33 and 34 which cooperate with the fixed contacts 35 and 36, respectively. Energization of the coil 31 causes the armature 32 to move to the left and move the switch arms 33 and 34 into engagement with their respective contacts. Upon deenergization of the coil 31, the switch arms move out of engagement with their respective contacts under the influence of gravity or any suitable biasing means (not shown).

For supplying power to the burner 14, wires 37 and 38 are connected to a suitable source of power (not shown) and a transformer 40 is provided for energizing the relay 30 and the heating element 24. This transformer includes a high tension primary 41 connected across the wires 37 and 38 and a low tension secondary 42.

With the parts in the positions illustrated, the relay 30 is deenergized and the burner 14 is shut down so that the furnace 10 is not supplying any warm air to the space except what residual heat has been stored therein. The thermostat has the arms 17 and 18 intermediate the contacts 21 and 22. In other words, neither arm is engaging its respective contact and it is assumed that the temperature in the space is dropping below the desired value. As soon as the temperature at the thermostat drops sufficiently so that arm 18 engages the contact 22, the relay 30 will be energized as follows: from one side of the transformer secondary 42 through conductor 45, the adjustable resistance 46, conductors 47, 48, 49, arm 18 of the thermostat 15, contact 22, conductors 51, 52, relay coil 31, and conductor 53 to the other side of the secondary 42. Energization of the relay coil causes movement of the switch arms 33 and 34 into engagement with their respective contacts. Engagement of arm 34 with contact 36 causes the burner motor 14 to be energized as follows: from wire 38 to contact 36, arm 34, conductor 55, the burner motor 14 and back through the line wire 37 to the source of power. Operation of the burner motor will cause the temperature within the furnace to rise and accordingly heat will be supplied to the space through the warm air duct 12.

Movement of arm 33 of the relay into engagement with the contact 35 establishes a maintaining circuit for the relay which is independent of the engagement of arm 18 of the thermostat with contact 22, this circuit being as follows: from the transformer secondary 42 through conductor 45, resistance 46, conductors 47, 48, heating element 24, conductors 60, 61, contact 35, arm 33, conductor 62, relay coil 31, and conductor 53 to the other side of the secondary 42. This maintaining circuit, it should be noted, includes the heating element 24 but as long as the relay is held in by the energizing circuit through the contact 22 and the thermostat arm 18, there will not be any appreciable flow of current through the heating element 24 so that this heating element will at this time cause substantially no increase in temperature of the bimetallic element 16.

After a sufficient lapse of time, the effect of operation of the burner 14 will be felt in the space 11 and the temperature will start to rise and after the thermostat arm 18 moves away from the contact 22, the relay 30 will be held in only by the maintaining circuit which includes the heating element 24 so that at this time the current flow through this circuit will be increased and the heating element will start to supply heat to the bimetallic element 16 and cause the temperature thereof to rise more rapidly than the space temperature. Thus the heating element 24 starts to anticipate the arrival of heat after some heat actually starts to arrive in the space, and accordingly the arm 17 of the thermostat will move into engagement with the contact 21 sooner than if the heating element 24 were not present.

When the arm 17 engages the contact 21, a shunt circuit around the relay coil 31 is energized, this circuit being as follows: from the left end of the coil 31 through conductor 65, a resistance element 66, conductors 67, 68, contact 21, arm 17, bimetallic element 16, conductors 70, 60, and 61, contact 35, switch arm 33, and conductor 62 to the other side of the relay coil 31. By reason of this shunt circuit, the current flow through the relay coil 31 is reduced sufficiently so that the relay is unable to maintain the switch arms in engagement with their respective contacts and accordingly the switch arms move out of engagement therewith. The maintaining circuit for the relay is now interrupted as is the circuit to the oil burner motor 14. A new circuit is now formed including the heating element 24 as follows: from one side of the transformer secondary 42 through conductor 45, resistance 46, conductors 47, 48, heating element 24, conductor 70, bimetallic element 16, arm 17, contact 21, conductors 68, 67, resistance element 66, and conductors 65 and 53 to the other side of the secondary 42. Accordingly, as long as the arm 17 of the thermostat remains in engagement with the contact 21 the heating element 24 will be energized and will continue to supply heat to the thermostat.

When the space temperature starts to drop below the value at which the arm 17 engaged the contact 21 so that the arm moves out of engagement therewith, the circuit through the heating element 24 is interrupted, and accordingly the temperature at the thermostat falls more rapidly than the space temperature is falling and in this manner the drop in temperature of the space is anticipated so that the thermostat causes operation of the oil burner sooner than it would were the heating element 24 not present.

The resistance element 66 is provided in the last named circuit through the heating element 24 to compensate for the resistance of the relay coil 31 which is in the first described circuit through the heating element. In other words, when the relay is energized solely by its holding circuit and the heating element 24 is energized, this relay coil is in series with the heating element. In order that the same amount of heat will be given off by the heating element when the thermostat is in its satisfied position, the resistance element 66 which has the same resistance value as the relay coil 31 is provided so that the current flow through the heating element 24 will be substantially the same and the same amount of heat will be given off by the heater to the thermostat. The adjustable resistance 46 is provided for varying the current flow through the circuit including the heater 24 so that the amount of heat given off thereby may be effectively controlled.

It should be noted that in this form of the invention, a single heating element suffices to anticipate both the rise and the drop in temperature in the space 11 and accordingly a relatively simple system is provided for controlling the space temperature and preventing undershooting and overshooting thereof. It should be understood that any suitable controls may be provided in the circuit to the oil burner motor 14 but since these form no part of the present invention they have not been illustrated.

Referring now to the form of invention illustrated in Figure 2, the thermostat for controlling the heating plant is illustrated as being a conventional type having a single contact arm movable between a pair of spaced contacts. This thermostat is illustrated at 80 and comprises the bimetallic element 81 carrying the arm 82 for movement between the contacts 83 and 84. Contact 83 is engaged by the arm 82 when the thermostat is satisfied and contact 84 is engaged thereby when the thermostat is calling for heat. In this form of the invention, a pair of heating elements 85 and 86 are positioned adjacent the thermostat to raise the temperature thereof above the space temperature.

A valve 90 which may control the supply of fuel, such as gas, to the furnace is illustrated. For operating the valve 90 a solenoid 91 cooperates with an armature 92 connected to the valve stem 93 of the valve 90 and the arrangement is such that when the solenoid 91 is energized the armature is attracted upwardly and the valve moves to open position. Upon deenergization of this solenoid the valve moves by gravity or under the influence of any suitable biasing means back to closed position. The armature 92 also controls a switch arm 95, the armature carrying a member 96 which engages the under portion of the arm 95 and when the valve is in open position the arm 95 is maintained in engagement with a contact 97 which, as will be explained, establishes a maintaining circuit through the solenoid 91.

A step-down transformer 100 is provided for supplying power to the solenoid 91 and the heating elements 85 and 86, this transformer including a high tension primary 101 connected to a suitable source of power (not shown), and a low tension secondary 102.

With the parts in the positions illustrated, the valve 90 is in closed position and the thermostat is moving its arm 82 towards the contact 84 indicating that the temperature in the space is dropping. As soon as the arm 82 engages the contact 84, a circuit is established to the solenoid 91 as follows: from the secondary 102 of transformer 100 through conductor 105, the resistance member 106, conductor 107, bimetallic element 81, arm 82, contact 84, conductors 108, 109, solenoid 91, and conductor 110 back to the other side of the secondary 102. Energization of the solenoid causes opening of the valve 90 and closure of the switch 95, 97 as heretofore explained. Closure of this switch creates a maintaining circuit for the solenoid 91 which is independent of the engagement of arm 82 of the thermostat 80 with the contact 84, this circuit being as follows: from the transformer secondary 102 through conductor 105, adjustable resistance 106, conductors 107, 112, heating element 86, conductor 113, switch arm 95, contact 97, conductors 114, 109, solenoid 91 and conductor 110 to the other side of the secondary 102. It will, accordingly, be apparent that after the arm 82 of the thermostat moves away from the contact 84, the solenoid 91 will remain energized through the maintaining circuit which includes the heating element 86. As long as the thermostat arm 82 is in engagement with the contact 84, however, the heating element 86 is shunted out and very little current flows therethrough so that this heating element supplies substantially no heat to the bimetallic element 81.

As soon as the space temperature starts to rise and the arm 82 of the thermostat moves away from the contact 84, the valve 90 is maintained open by means of the maintaining circuit through the switch arm 95 and the heater 86 and this heating element now heats up and raises the temperature of the bimetallic elements 81 above the space temperature. The arm 82 will accordingly move towards the contact 83 at a faster rate than if the heating element 86 were not present, and upon engagement of the arm 82 with the contact 83 a shunt circuit is formed around the solenoid 91 as follows: from the upper portion of the coil 91 through conductor 120, resistance 125, conductor 126, heating element 85, conductor 121, contact 83, thermostat arm 82, bimetallic element 81, conductor 112, heater 86, conductor 113, switch arm 95, contact 97, conductors 114 and 109 to the lower portion of the solenoid 91. While this circuit does not short circuit the solenoid 91, nevertheless it is designed to reduce the current flow therethrough sufficiently so that it is no longer able to maintain the valve 90 in open position so that the armature 92 drops, the valve 90 closes and the switch 95 opens. The supply of fuel to the furnace is now cut off or reduced to a minimum value but as long as the thermostat arm 82 remains in engagement with the contact 83, current will flow through the heating element 85 as follows: from the transformer secondary 102 through conductor 105, resistance 106, conductor 107, bimetallic element 81, arm 82, contact 83, conductor 121, heating element 85, conductor 126, resistance 125 and conductors 120 and 110 to the other side of the secondary 102. Thus while the heating element 86 has been deenergized, the heating element 85 is simultaneously energized and continues to supply heat to the thermostat 80 as long as the arm 82 is in engagement with the contact 83. As soon as the arm moves away from the contact indicating that the temperature of the space is starting to fall, the current flow through the heating element 85 will be interrupted and the temperature at the thermostat will drop more rapidly as a consequence thereof than does the space temperature, in this way anticipating the drop in temperature in the space so that the heating system is placed into operation before the temperature actually drops below the desired value so as to compensate for the time required for the space temperature to begin to rise after the heating plant is placed in operation.

The resistance 125 corresponds to the resistance 66 of Figure 1 and is designed to have substantially the same resistance value as the solenoid 91 so that, if the heaters 85 and 86 have the same resistance values, the current flow will be the same through each heater, so that the same amount of heat will be supplied to the thermostat regardless of which of the heaters is energized. The adjustable resistance 106 provides for varying the heating effect of the heating elements and thus adjusting the anticipating effects of these heaters so that the thermostat may be properly adjusted for the type of heating system with which it is to be used. This feature is desirable since it is well known that different types of heating systems have different inherent time lags. Thus a warm air heating system as illustrated in Figure 1 would have a lesser time lag than would a hot water heating system, for example, and the anticipating effect of the heater 24 in this figure should accordingly be less when the system is used with a warm air furnace than if it were used with a hot water heating system.

It will be apparent that the systems of Figure 1 and Figure 2 operate in precisely the same manner and that the two heating elements of Figure 2 perform the same function as the single heating element of Figure 1. It will also be understood that the system of Figure 2 may be utilized to control any type of heating plant and is not restricted to the control of a valve as shown. For example, the solenoid 91 might be a relay coil as in Figure 1 and this relay might control an oil burner or any other suitable form of heater.

While I have illustrated two preferred forms of my invention, it should be understood that it is susceptible of many modifications and I therefore desire to be limited only by the scope of the appended claims.

I claim as my invention:

1. In a system of the class described, a space temperature changing means, temperature responsive means in control of said temperature changing means and including a member movable between a pair of spaced contacts in response to changes in temperature affecting said temperature responsive means, means responsive to engagement of said member with one of said spaced contacts for increasing the temperature changing effect of said temperature changing means, means for maintaining the temperature changing means in said condition until said movable member moves into engagement with the other of said contacts, means responsive to engagement of said member with the other of said contacts to decrease the temperature changing effect of said temperature changing means, local temperature changing means adjacent said temperature responsive means to cause the temperature responsive means to respond to a temperature different from the ambient temperature when said local temperature changing means is energized, means responsive to movement of said member out of engagement with one of said contacts to energize said local temperature changing means, and means to continue the energization of said local temperature changing means upon movement of said member into engagement with the other of said contacts and to interrupt such energization when said member moves out of such engagement.

2. In a system of the class described, a space heating means, a space thermostat in control of said heating means and including a member movable between a pair of spaced contacts in response to changes in temperature affecting said space thermostat, means responsive to engagement of said member with one of said contacts to increase the heating effect of the heating means, means for maintaining the heating means in heat increasing condition until said member moves into engagement with the other of said contacts, means responsive to movement of said member with the other of said contacts to decrease the heating effect of the heating means, local heating means adjacent said thermostat to raise the temperature thereof above the ambient temperature, means responsive to movement of said member out of engagement with said one of said contacts to energize said local heating means, and means to continue the energization of said local heating means upon movement of said member into engagement with the other of said contacts and to interrupt such energization when said member moves out of such engagement.

3. In a system of the class described, a space heating means, a space thermostat in control of said heating means and including a member movable between a pair of spaced contacts in response to changes in temperature affecting said space thermostat, said member including a pair of contact arms insulated from one another, means responsive to engagement of one of said contact arms with one of said contacts to increase the heating effect of the heating means, means for maintaining the heating means in heat increasing condition until the other contact arm moves into engagement with the other of said contacts, means responsive to engagement of the other contact arm with the other of said contacts to decrease the heating effect of the heating means, local heating means adjacent said thermostat to raise the temperature thereof above the ambient temperature, means responsive to movement of said one of said contact arms out of engagement with the cooperating contact to energize said local heating means, and means to interrupt the energization of said local heating means in response to movement of said other contact arm out of engagement with the other of said contacts.

4. In a system of the class described, a space heating means, a space thermostat in control of said heating means and including a member movable between a pair of spaced contacts in response to changes in temperature affecting said space thermostat, said member including a contact blade, means responsive to movement of said contact blade into engagement with one of said contacts to increase the heating effect of the heating means, means for maintaining the heating means in heat increasing condition until said contact blade moves into engagement with the other of said contacts, means responsive to engagement of the contact blade with the other of said contacts to decrease the heating effect of the heating means, local heating means adjacent the thermostat to raise the temperature thereof above the ambient temperature, said local heating means including a resistance element in series with the maintaining means so that when the space heating means is maintained in heat increasing condition solely by said maintaining means, the local heating means is energized, said local heating means also including a second resistance element, and means responsive to engagement of said contact blade with said second contact for energizing said second resistance element.

5. In a system of the class described, a space heating means, electrical control means therefor arranged when energized to increase the heating effect of said heating means and when deenergized to decrease the heating effect thereof, a space thermostat in control of said electrical control means, said thermostat including a member, movable in response to changes in temperature affecting said thermostat, between a pair of spaced contacts, means responsive to engagement of said movable member with one of said contacts for energizing said electrical control means, means responsive to energization of said electrical control means forming a maintaining circuit therefor to maintain the electrical control means energized after the movable member moves away from said one of said contacts, an electrical heating element in close proximity to said thermostat, said heating element being included in said maintaining circuit, means responsive to engagement of said movable member with the other of said contacts for deenergizing said electrical control means whereby the maintaining circuit is simultaneously opened, and a second electrical heating element adjacent said thermostat and energized when said movable member is in engagement with the other of said contacts.

6. In a system of the class described, a space heating means, electrical control means therefor arranged when energized to increase the heating effect of said heating means and when deenergized to decrease the heating effect thereof, a space thermostat in control of said electrical control means, said thermostat including a member movable between a pair of spaced contacts in response to changes in temperature affecting said thermostat, means responsive to engagement of said movable member with one of said contacts for energizing said electrical control means, means responsive to energization of said electrical control means forming a maintaining circuit therefor to maintain the electrical control means energized after the movable member moves away from said one of said contacts, an electrical heating element in close proximity to said thermostat, said heating element being included in said maintaining circuit, means responsive to engagement of said movable member with the other of said contacts for deenergizing said electrical control means whereby the maintaining circuit is simultaneously opened, and a second electrical heating element adjacent said thermostat and energized when said movable member is in engagement with the other of said contacts, said heating elements, when energized, each supplying substantially the same amount of heat to the space thermostat.

7. In a system of the class described, a space heating means, electrical control means therefor arranged when energized to increase the heating effect of said heating means and when deenergized to decrease the heating effect thereof, a space thermostat in control of said electrical control means, said thermostat including a member movable between a pair of spaced contacts in response to changes in temperature affecting said thermostat, means responsive to engagement of said movable member with one of said contacts for energizing said electrical control means, means responsive to energization of said electrical control means forming a maintaining circuit therefor to maintain the electrical control means energized after the movable member moves away from said one of said contacts, an electrical heating element in close proximity to said thermostat, said heating element being included in said maintaining circuit, means responsive to engagement of said movable member with the other of said contacts for deenergizing said electrical control means whereby the maintaining circuit is simultaneously opened, a second electrical heating element adjacent said thermostat and energized when said movable member is in engagement with the other of said contacts, said heating elements, when energized, each supplying substantially the same amount of heat to the space thermostat, and means for simultaneously varying the heating effect of said heating elements.

8. In a system of the class described, a space heating means, a plurality of electrical circuits controlling said heating means including a first circuit which causes an increase in the heating effect of the heating means in response to energization thereof, a second circuit which maintains the heating means in the heat increasing condition after the first circuit is open, a third circuit which causes the second circuit to open in response to energization thereof, a space thermostat, means responsive to a drop in temperature at the thermostat to a predetermined value to cause the energization of the first circuit, an electrical heating means in proximity to said space thermostat connected in said second circuit whereby it causes an increase in temperature at the thermostat when the first circuit opens, means responsive to a rise in temperature at said thermostat to a predetermined value to energize said third circuit, and a second electrical heating means in said third circuit in close proximity to said thermostat.

9. In a system of the class described, a space heating means, a space thermostat in control of said space heating means and arranged to place said heating means in a heat increasing condition in response to the attainment of a predetermined low temperature adjacent said thermostat and to place said heating means in a heat decreasing condition in response to the attainment of a predetermined high temperature adjacent said thermostat, an electrical resistance element located adjacent said thermostat and arranged, when energized, to raise the temperature thereof above the ambient temperature, means for energizing said electrical resistance element in response to a rise in temperature at the thermostat above the value at which the space heating means is placed in heat increasing condition, and means for maintaining said electrical resistance element energized until the space heating means is placed in a heat decreasing condition and the temperature at the thermostat drops below the value at which the space heating means was placed in a heat decreasing condition, whereupon the electrical resistance element is deenergized.

10. In a system of the class described, a space heating means, a space thermostat in control of said heating means and including a member movable between a pair of spaced contacts in response to changes in temperature affecting said space thermostat, means responsive to engagement of said member with one of said contacts to increase the heating effect of the heating means, means for maintaining the heating means in heat increasing condition until said member moves into engagement with the other of said contacts, means responsive to engagement of said member with the other of said contacts to decrease the heating effect of the heating means, local heating means adjacent said thermostat to raise the temperature thereof above the ambient temperature, said local heating means comprising a single electrical resistance element positioned in close proximity to said thermostat, means responsive to movement of said member out of engagement with said one of said contacts to energize said electrical resistance element, and means to maintain said electrical resistance element energized until the movable member has moved into and out of engagement with the other of said contacts whereupon said electrical resistance element is deenergized.

11. In a system of the class described, a space heating means, a space thermostat in control of said heating means and including a contact member movable between a pair of spaced contacts in response to changes in temperature affecting said space thermostat, means responsive to movement of said contact member into engagement with one of said contacts to increase the heating effect of the heating means, means initially operative upon movement of said member into engagement with said one contact for maintaining the heating means in heat increasing condition until said contact member moves into engagement with the other of said contacts, means responsive to engagement of the contact member with the other of said contacts to render said maintaining means ineffective and thus to decrease the heating effect of the heating means, and local heating means adjacent the thermostat to raise the temperature thereof above the ambient temperature, said heating means including a heating element in series with the maintaining means so that when the heating means is maintained in heat increasing position solely by said maintaining means the heating means is energized.

12. In a system of the class described, a space heating means, electrical control means therefor arranged when energized to increase the heating effect of said heating means and when deenergized to decrease the heating effect thereof, said control means being further operative when energized to close a control switch, a space thermostat including a contact member movable between a pair of spaced contacts in response to changes in temperature affecting said thermostat, an energizing circuit for said control means including said movable thermostat contact member and one of said spaced contacts, a maintaining circuit for said control means established during closure of said control switch and independent of said one thermostat contact, local heating means adjacent the thermostat to raise the temperature thereof above the ambient temperature, said local heating means including an electrical heater connected in said maintaining circuit in parallel with said thermostat movable contact member and said one contact so as to be shunted until said contact member separates from said one contact, and a circuit established upon engagement of said movable thermostat contact member with the other of said spaced contacts for shunting said electrical control means to deenergize the same.

GIFFORD I. HOLMES.

CERTIFICATE OF CORRECTION.

Patent No. 2,248,924. July 15, 1941.

GIFFORD I. HOLMES.

It is hereby certified that error appears in the printed specification of the above numbered patent requiring correction as follows: Page 1, first column, line 32, for "temperature" read --thermostat--; page 4, second column, line 21, claim 2, for the word "movement" read --engagement--; and that the said Letters Patent should be read with this correction therein that the same may conform to the record of the case in the Patent Office.

Signed and sealed this 28th day of October, A. D. 1941.

(Seal)

Henry Van Arsdale,
Acting Commissioner of Patents.